US008086364B2

(12) United States Patent
Xue et al.

(10) Patent No.: US 8,086,364 B2
(45) Date of Patent: Dec. 27, 2011

(54) SYSTEM AND METHOD FOR OPERATION OF ELECTRIC AND HYBRID VEHICLES

(75) Inventors: Ya Xue, Niskayuna, NY (US); Lembit Salasoo, Schenectady, NY (US); Timothy Gerard Richter, Wynantskill, NY (US); Weizhong Yan, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/719,921

(22) Filed: Mar. 9, 2010

(65) Prior Publication Data

US 2010/0235030 A1    Sep. 16, 2010

Related U.S. Application Data

(63) Continuation-in-part of application No. 12/401,726, filed on Mar. 11, 2009, now Pat. No. 8,024,082.

(51) Int. Cl.
    *G06F 19/00* (2006.01)
    *B60K 6/00* (2007.10)
(52) U.S. Cl. .................... 701/22; 701/213; 701/208
(58) Field of Classification Search ................ None
    See application file for complete search history.

(56) References Cited

U.S. PATENT DOCUMENTS

| | | | | |
|---|---|---|---|---|
| 5,270,937 A | * | 12/1993 | Link et al. | 701/209 |
| 5,422,815 A | * | 6/1995 | Hijikata | 701/208 |
| 5,488,559 A | | 1/1996 | Seymour | |
| 5,948,043 A | * | 9/1999 | Mathis | 701/208 |
| 6,507,127 B1 | | 1/2003 | Amano et al. | |
| 6,949,897 B2 | | 9/2005 | Wakashiro et al. | |
| 7,003,397 B2 | * | 2/2006 | Yokota et al. | 701/200 |
| 7,117,087 B2 | | 10/2006 | Jung et al. | |
| 7,197,392 B2 | | 3/2007 | Lee et al. | |
| 7,360,615 B2 | | 4/2008 | Salman et al. | |
| 7,512,486 B2 | * | 3/2009 | Needham et al. | 701/202 |
| 2002/0072849 A1 | * | 6/2002 | Endo et al. | 701/211 |
| 2003/0015358 A1 | * | 1/2003 | Abe et al. | 180/65.3 |
| 2003/0015874 A1 | * | 1/2003 | Abe et al. | 290/40 C |
| 2003/0201912 A1 | | 10/2003 | Hashida et al. | |
| 2004/0210383 A1 | * | 10/2004 | Sato | 701/207 |
| 2005/0228553 A1 | * | 10/2005 | Tryon | 701/22 |
| 2008/0091347 A1 | | 4/2008 | Tashiro | |
| 2008/0119982 A1 | | 5/2008 | Yamada | |
| 2008/0262668 A1 | * | 10/2008 | Yamada | 701/22 |
| 2008/0319596 A1 | | 12/2008 | Yamada | |

FOREIGN PATENT DOCUMENTS

| | | |
|---|---|---|
| EP | 0811757 A2 | 12/1997 |
| EP | 2000377 A2 | 12/2008 |
| JP | 7063570 A | 3/1995 |
| JP | 9005096 A | 1/1997 |

\* cited by examiner

*Primary Examiner* — Michael J. Zanelli
(74) *Attorney, Agent, or Firm* — Ziolkowski Patent Solutions Group, SC; Jean K. Testa

(57) ABSTRACT

A system for operating an electric or hybrid-electric vehicle includes a computer programmed to identify a location of a vehicle, access a map and identify a plurality of links therein, pre-screen the plurality of links to identify if any of the plurality of links is within a given bounds of the current location, and if one or more possible links are identified, then match the current location of the vehicle to one of the identified links, and upload power data for the vehicle corresponding to the matched location into a database.

20 Claims, 7 Drawing Sheets

SYSTEM AND METHOD FOR OPERATION OF ELECTRIC AND HYBRID VEHICLES

CROSS-REFERENCE TO RELATED APPLICATIONS

The present application is a continuation-in-part of and claims priority to U.S. patent application Ser. No. 12/401,726 filed Mar. 11, 2009.

GOVERNMENT RIGHTS IN THE INVENTION

The U.S. Government has a paid-up license in this invention and the right in limited circumstances to require the patent owner to license others on reasonable terms as provided for by the terms of Government Contract No. MA-04-7001 awarded by the Federal Transit Administration of the United States Department of Transportation.

BACKGROUND OF THE INVENTION

Embodiments of the invention relate generally to hybrid and electric vehicles, and more specifically to a system and method for energy management and operation of hybrid and electric vehicles.

Hybrid electric vehicles combine an internal combustion engine and an electric motor that is typically powered by one or more electrical energy storage components. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

In many conventional hybrid vehicles, electric motors also enable the capture of braking energy by acting as generators and providing such captured braking energy to energy storage components (ESCs). ESCs such as batteries, ultracapacitors, or flywheels are used to capture energy present during braking or generation operations for reuse at a later time. These components also provide load-leveling functionality to reduce transient loading to the primary power-producing device in the system. Such installations generally operate with limited or no information about the environment or terrain and lack predictive capability to foresee upcoming events. This often results in sub-optimal usage of the ESCs that can shorten life because of unnecessary applied stresses. Often, ESCs are over-sized for the application to ensure that stress limits are not exceeded, which adds cost to the system. Because such vehicles typically operate without information regarding environment or terrain, in order to react to charging and discharging events, the state of charge of the ESC is typically maintained near the midpoint of the useable storage range of the ESC.

If the vehicle is traveling in a valley or along a high point in the local terrain, hybrid energy recovery may not be maximized. For example, if the vehicle were at a high point in the local terrain with the ESC state of charge at the midpoint, the impending downhill regenerative capture opportunity ceases when the battery reaches full state of charge, which may occur partway down the hill. Accordingly, the full downhill regenerative capture opportunity is stopped short. In addition, the battery will likely charge at 100% power, operate at the limits of stress, and create excessive heat and temperature rise. The converse is true for starting at a low point in the terrain where the hybrid assist is halted when the battery is exhausted of charge prior to reaching the summit.

Typically, during a trip along a route, a control scheme for the vehicle may be based on conventional parameters such as elevation, route, terrain, and other topographical information. Such a control scheme can result, as an example, in a battery reaching a full charge despite having additional regenerative energy available. In this example, after the battery reaches a full charge, some regenerative energy that could otherwise be captured is lost, and overall system efficiency is thus lower than it otherwise could have been. In another example of a conventional control scheme, peak power demands may cause a battery bank to be fully depleted, resulting in an overall decreased life expectancy. Future trips along the same route that are based on these conventional parameters may repeat the same inefficiencies and fail to learn from past or historical experience.

A control scheme could include this historical knowledge to optimize overall system efficiency while improving overall life expectancy for future trips along the route. This control scheme may include, for instance, reducing battery bank storage in order to take full advantage of available regenerative power, or it may include avoiding full battery depletion while traveling along the route to reduce a deep draw on the battery that can reduce overall life of the battery. Such a control scheme may be based on historical knowledge that is input to a database and made available for future use. Thus, after one or more trips along the route, it is possible to adjust the operating or control parameters in order to learn from past experience and continually improve subsequent control schemes over the route. Each trip along the route thereby improves overall system performance, and as more data is accumulated of the route, peak overall performance can be achieved that is tailored to current operating conditions.

In order to enable later access to the historical data, the historical data is typically uploaded to a historical database. However, due to accuracy tolerances in Global Positioning System (GPS) sensors, GPS trajectories may not align with a road the vehicle is driving on. Thus, although useful information may be gained from a trip, such information may be lost due to an inability to match a location with links within a map, and thus it may not be properly associated with a known location in a map database. Further, conventional algorithms for determining a position within a map via a GPS sensor can be computationally intensive or burdensome. Thus, while useful data that includes position readings from a GPS sensor and associated power-use and other statistical information may be gained from a trip, the useful data may be lost in some instances when the algorithm for determining a vehicle location in a map database and uploading data to the historical database becomes overwhelmed and is unable to keep up with the realtime data acquisition rates.

It would therefore be desirable to have a system and method capable of efficiently creating a database and operation of a hybrid power system.

BRIEF DESCRIPTION OF THE INVENTION

Embodiments of the invention are directed to a system and method for creating a database that overcome the aforementioned drawbacks.

According to an aspect of the invention, a system for operating an electric or hybrid-electric vehicle includes a computer programmed to identify a location of a vehicle, access a map and identify a plurality of links therein, pre-screen the plurality of links to identify if any of the plurality of links is within a given bounds of the current location, and if one or more possible links are identified, then match the current location of the vehicle to one of the identified links, and upload power data for the vehicle corresponding to the matched location into a database.

According to another aspect of the invention, a method of controlling operation of an electric or hybrid-electric vehicle includes identifying a current location of a vehicle, applying a pre-screening algorithm with respect to a link within a map and the current location, determining if the one or more links are within a given bounds, and, if so, then matching the current location of the vehicle to the link within the map via a subsequential matching algorithm, and uploading power information used by the vehicle along the link and at the current location into a historical power-use database.

According to another aspect of the invention, a computer readable storage medium having a computer program stored thereon and representing a set of instructions that when executed by a computer causes the computer to measure a current location of a vehicle, execute a pre-screening algorithm to determine possible links of a map that are within a predetermined distance from the current location and, if one or more links are within the predetermined distance from the current location, then the computer is caused to execute a map-matching algorithm to determine which of the one or more links corresponds to the actual link along which the vehicle is traveling, and upload power information related to the vehicle at the current location to a historical database.

Various other features and advantages will be made apparent from the following detailed description and the drawings.

BRIEF DESCRIPTION OF THE DRAWINGS

The drawings illustrate one or more embodiments of the invention.

In the drawings.

DETAILED DESCRIPTION

The invention includes embodiments that relate to optimization of energy storage component usage. The invention includes embodiments that relate to methods for generating expected power usage for a hybrid vehicle and for uploading power usage and other data obtained during operation of a hybrid vehicle to a historical database. The invention is described with respect to a hybrid vehicle. The embodiments and methods illustrated herein may be applied to hybrid vehicles, range extended electric vehicles, plug-in hybrid electric vehicles (PHEV), multi-energy storage electric vehicles, and the like. The embodiments and methods illustrated herein may be broadly applied to passenger and commercial hybrid vehicles as well as to locomotives and off-highway vehicles. It should also be understood that a vehicular implementation is only one of many uses for this technology. Any system containing power generation, consumption, and energy storage components is a candidate for incorporating embodiments of the invention.

Figure 1:
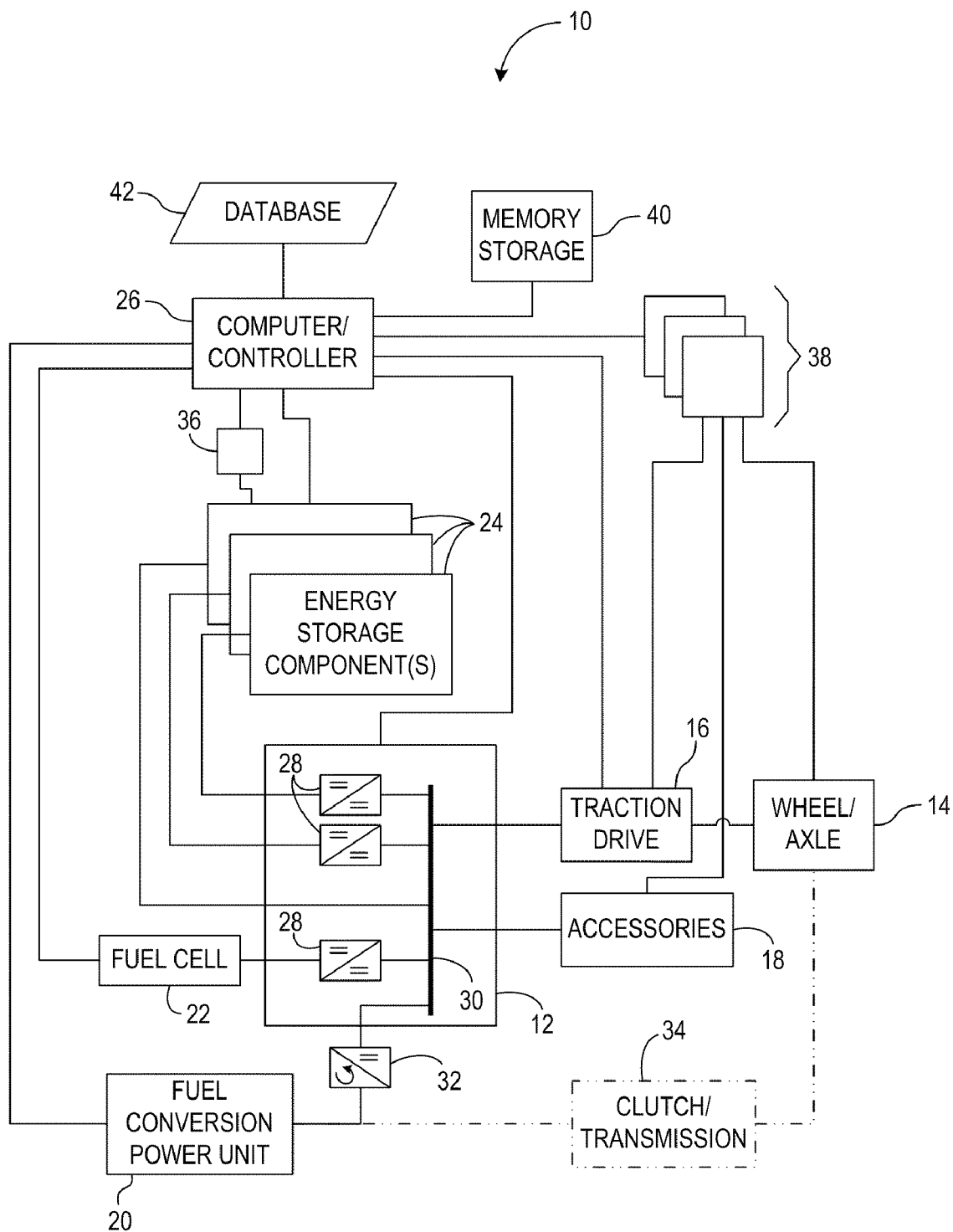
FIG. 1 is a schematic diagram of a hybrid system according to an embodiment of the invention.

FIG. 1 illustrates an exemplary hybrid vehicle 10 incorporating embodiments of the invention. Hybrid vehicle 10 includes an energy management system (EMS) 12 configured to impart power to a wheel or axle 14 via an electric or traction drive 16 of hybrid vehicle 10. Energy management system 12 is also configured to impart power to accessories 18 of hybrid vehicle 10. Accessories 18 may include, but are not limited to, an air conditioning/heating system, a radio, and a vehicle lighting system. Hybrid vehicle 10 includes a fuel conversion unit 20, such as an internal combustion engine (ICE), coupled to EMS 12 and may include a fuel cell 22 coupled to EMS 12. An energy storage component (ESC) or bank of ESCs 24 is also coupled to EMS 12. ESCs may be, for example, batteries.

Hybrid vehicle 10 includes a computer/controller 26 coupled to EMS 12 to selectively control power transfer to traction drive 16 from fuel conversion unit 20, fuel cell 22, or the ESCs 24. Energy management system 12 may include a DC/DC converter 28 for each energy source input into EMS 12 if DC conversion from the energy source to a DC link 30 is needed. FIG. 1 shows three DC/DC converters 28 in EMS 12; however, it is contemplated that more or less than three DC/DC converters 28 may be included. Furthermore, fuel conversion unit 20 may be coupled to energy management system 12 via a torque/DC converter 32 for converting torque from fuel conversion unit 20 into DC energy suitable for DC link 30.

By controlling both fuel conversion unit 20 and ESCs 24 to supply input power into EMS 12, ESCs 24 may assist fuel conversion unit 20 in imparting power to traction drive 16 by drawing energy therefrom. In this manner, ESCs 24 and fuel conversion unit 20 may simultaneously provide power to traction drive 16 during periods of acceleration or hill climbs, for example.

It is contemplated that, in a parallel configuration shown in phantom, fuel conversion unit 20 may be coupled to axle 14 via a clutch/transmission assembly 34. In this configuration, the coupling of fuel conversion unit 20 to energy management system 12 via torque/DC converter 32 would not be needed. Other hybrid configurations such as, for example, a hydraulic hybrid including a manifold are contemplated and envisioned herein.

Further, traction drive 16 and EMS 12 may be controlled to provide recharging power to recharge ESCs 24. For example, during braking operations of hybrid vehicle 10, by controlling EMS 12 and by operating traction drive 16 in a generator mode, torque generated in wheel or axle 14 may be directed to electric motor 16 to slow or brake hybrid vehicle 10 and to convert and store the energy therefrom in ESCs 24. As such, energy used to slow or stop hybrid vehicle 10 during regenerative braking may be recaptured and stored in ESCs 24 for later use to provide power to hybrid vehicle 10 or accessories 18 thereof. Monitoring of the state of charge (SOC) of the battery 24 may be accomplished via a state of charge sensor 36 coupled to ESCs 24 and to computer 26 to aid in the charging and discharging of energy from ESCs 24.

FIG. 1 further illustrates computer 26 configured to receive information from a plurality of sensors 38 and to store the received information in a computer readable memory storage 40. In an embodiment of the invention as described below with respect to FIG. 2, computer 26 may be configured to receive sensor data from sensors 38 while hybrid vehicle 10 travels along a road network and to store the sensor data in memory storage 40 for further processing and storage in a database 42. In an embodiment of the invention as described below with respect to FIG. 6, computer 26 may be configured to generate and optimize an expected power usage for the route based on the data stored in database 42.

While FIG. 1 is illustrated with respect to an exemplary hybrid vehicle 10, embodiments of the invention are not limited to such. It is contemplated that embodiments of the invention also include any electric-based vehicle having, for example, a fuel conversion unit or not. Examples of vehicles incorporating embodiments of the invention include, but are not limited to, hybrid vehicles, electric vehicles (EVs), range extended EVs, plug-in hybrid electric vehicles (PHEVs), multi-energy storage EVs, and the like.

Figure 2:
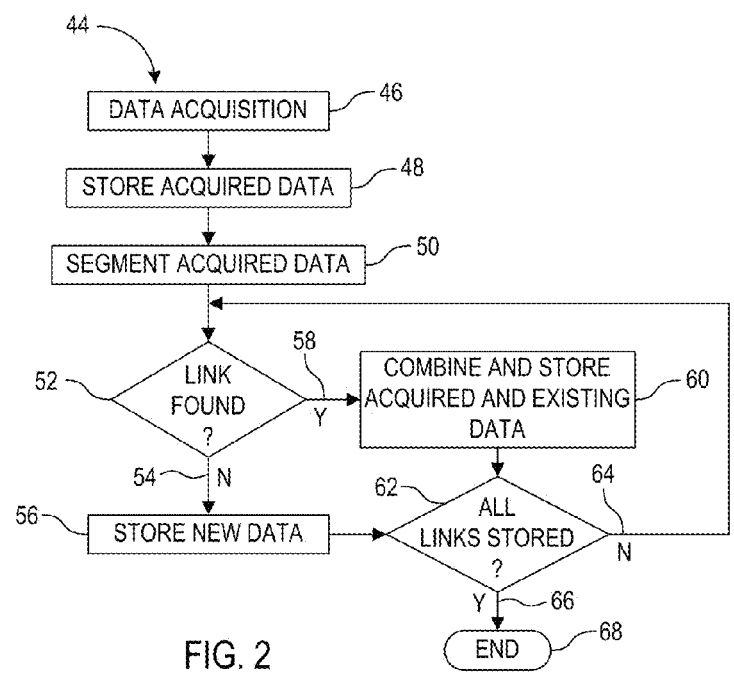
FIG. 2 is a flowchart showing a technique for acquiring and storing energy and power usage data during vehicle travel according to an embodiment of the invention.

FIG. 2 shows a technique 44 for acquiring and storing energy and power usage data during vehicle travel according to an embodiment of the invention. Technique 44 may be programmed into a computer or controller such as computer 26 of FIG. 1. At block 46, data sets are measured or acquired of a hybrid vehicle via sensors such as sensors 38 of FIG. 1 as the vehicle travels from one location to another. Examples of measured data include, but are not limited to, fraction motor power usage, accessory load power usage, vehicle speed, latitude and longitude of the vehicle, and date and time stamps of when the data is acquired. Other types of statistics and data relevant to an energy optimization technique may also be measured and uploaded to a historical database, according to embodiments of the invention.

Figure 3:
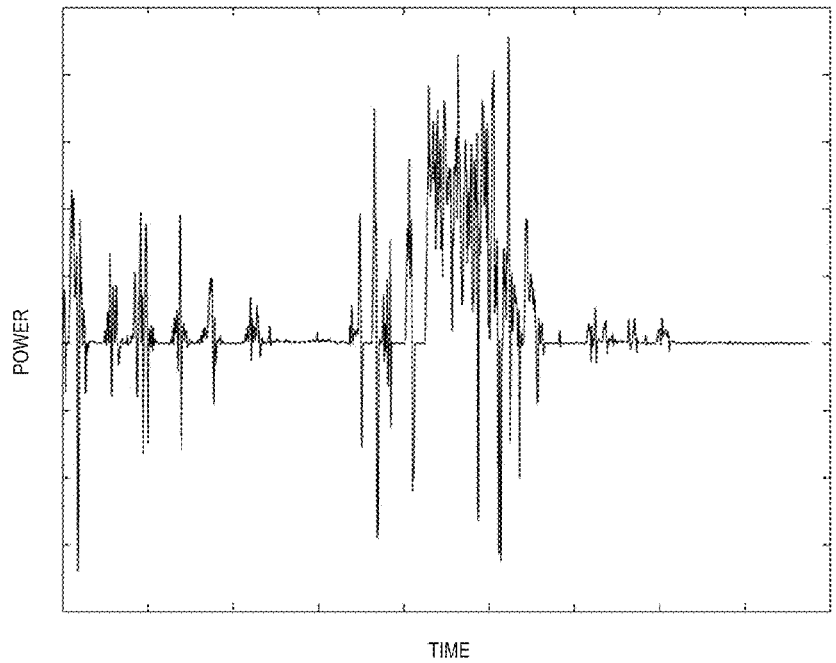
FIG. 3 is a plot showing exemplary data measured along a route using a time-based measurement interval.
Figure 4:
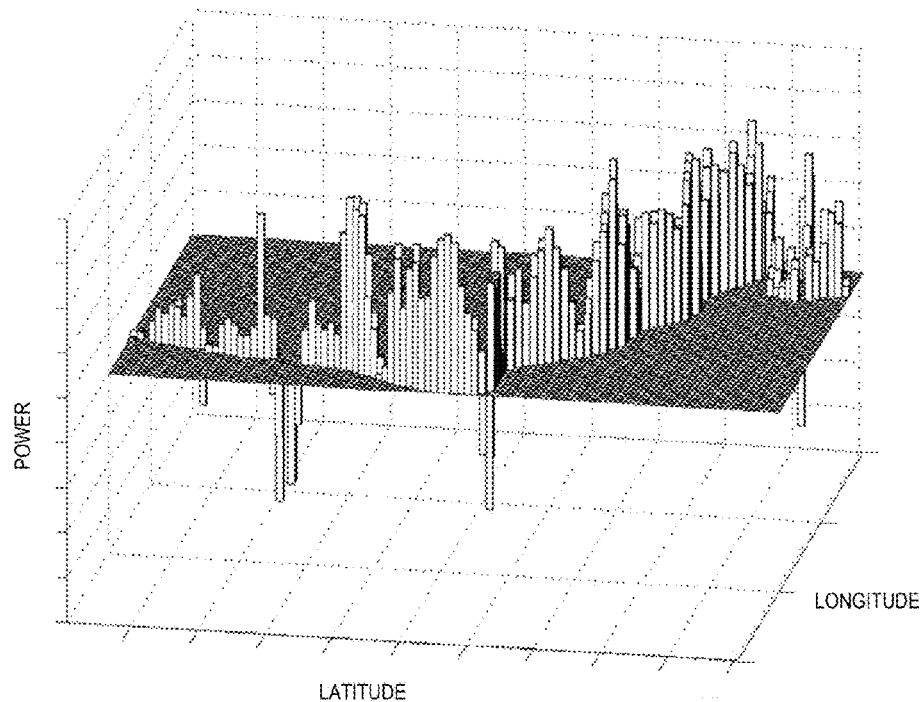
FIG. 4 is a plot showing exemplary data measured along a route using a positional-based measurement interval.

In one embodiment, each data set is measured or recorded at regular measurement intervals such as an interval of time (e.g., once per second) or such as an interval of position (e.g., once per five hundred feet). FIG. 3 shows an exemplary plot of data measured using a time interval as the measurement interval. FIG. 4 shows an exemplary plot of data measured using a position interval such as latitude and longitude as the measurement interval. Each measured data set also relates to the direction or heading of travel.

Referring again to FIG. 2, each collected data set is stored in a memory storage such as memory storage 40 of FIG. 1 at block 48. As the hybrid vehicle travels from one location to another, multiple data sets are acquired and stored as the measurement intervals direct. However, according to an embodiment of the invention, terrain data, including relief or surface features/configuration of an area of land such as gradients, elevation, or topography, are not stored. In this manner, topographical, elevational, or three-dimensional mapping data is not needed for expected energy optimization.

The stored data is segmented at block 50. Segmenting splits the stored acquired data into a plurality of sub-records or links such that the records can be conveniently stored into the database. Similar to a road map network representation, links are uniquely defined by start and end nodes. Often, a start or end node overlaps with a start or end node of another link. Nodes may be defined in a number of ways. A first way is to directly define nodes using the nodes defined on a digital map of a region of interest containing the routes that the hybrid vehicle has traveled. A second way is to define nodes based on characteristic changes of the recorded power or related waveforms. A third way is to set nodes as the intersections of cycle trajectories, which can be analytically determined from the measured data stored in the database. After nodes are such defined, links between start and end nodes are identified and uniquely numbered.

At block 52, technique 44 determines whether a link identified in the segmenting block is associated with a link already stored in a database such as database 42 of FIG. 1. If the link is not associated with stored data 54, then the link data is added as a new entry into the database at block 56. If the link is associated with data previously stored in the database 58, then the acquired link data is combined with the existing link data at 60.

Combining combines acquired data and stored records for the same cycles and operating regimes into a single record. Combining considers process variation and measurement errors to best represent measured values for the same indices as one process. The acquired data can be interpolated or averaged with the stored data. In addition, different cycles in the same operating regime can be interpolated or averaged to reduce the collected data set. Acquired data from one or more different vehicles of a fleet and from different days and times may be combined in this manner. Also, combining may include combinations performed only for the cycles within a window of an independent index such as time of day or ambient temperature. Statistics of the combining records are calculated and stored. Statistics may include the number of times or frequency of hybrid vehicle travel along a particular link.

Power, speed, and other performance information associated with each link measured at regular intervals along the link are combined or stored into the database with, for example, link identifications (IDs) as the key field. Table 1 illustrates an example of link data stored in the database for link L112.

TABLE 1

| LINK ID | L112 |
| --- | --- |
| Start Node | N35 |
| End Node | N23 |
| Power | (a) |
| Speed | (b) |
| Frequency | 8 |
| Time Window | 3 |

In an embodiment of the invention, data associated with the power and speed of link L112 illustrated in Table 1 are multi-element vectors corresponding to measured points along the link. Data associated with nodes such as start node N35 may be stored in a separate table in the database. The node data may include longitude and latitude positions measured or calculated for the node.

In one embodiment, the node IDs in the database may be related to each of the links leading to and from the node together with the frequency that a hybrid vehicle has traveled along the link. Table 2 illustrates an example of a relationship between nodes and links together with the frequency of vehicle travel data recordation.

TABLE 2

|  | NODE ID | LINK IN | LINK OUT | FREQUENCY (%) |
| --- | --- | --- | --- | --- |
| 1 | N22 | L111 | L117 | 100 |
| 2 | N22 | L116 | L117 | 40 |
| 3 | N22 | L116 | L113 | 60 |
| 4 | N23 | L109 | L111 | 70 |
| 5 | N23 | L109 | L114 | 15 |
| 6 | N23 | L109 | L115 | 15 |
| 7 | N23 | L112 | L110 | 40 |
| 8 | N23 | L112 | L111 | 30 |
| 9 | N23 | L112 | L115 | 10 |
| 10 | N23 | L113 | L110 | 80 |
| 11 | N23 | L113 | L114 | 15 |
| 12 | N23 | L113 | L115 | 5 |
| 13 | N23 | L118 | L110 | 50 |
| 14 | N23 | L118 | L111 | 30 |
| 15 | N23 | L118 | L114 | 20 |

As shown in Table 2, node ID N22 has two incoming links and two outgoing links associated therewith. Node ID N23 has four incoming links and four outgoing links associated therewith.

After acquired data is stored 56 or combined 60, technique 44 determines whether data for more sub-records or links remain to be stored or combined at block 62. If more link data remain 64, process control returns to block 62 and continues as described above. If all link data has been stored 66, technique 44 ends 68.

Accordingly, technique 44 includes the creation and storage of a database that that includes historical power usage data by the electric motor and other electrical components of a hybrid vehicle along one or more links. It is contemplated that technique 44 is performed as an on-going process as the links are repeatedly traveled by vehicles such that data for each link may be refined. Expected energy usage along a link or expected route may be optimized based on the data stored in the database created via technique 44 as will be described below with respect to FIG. 6.

Figure 5:
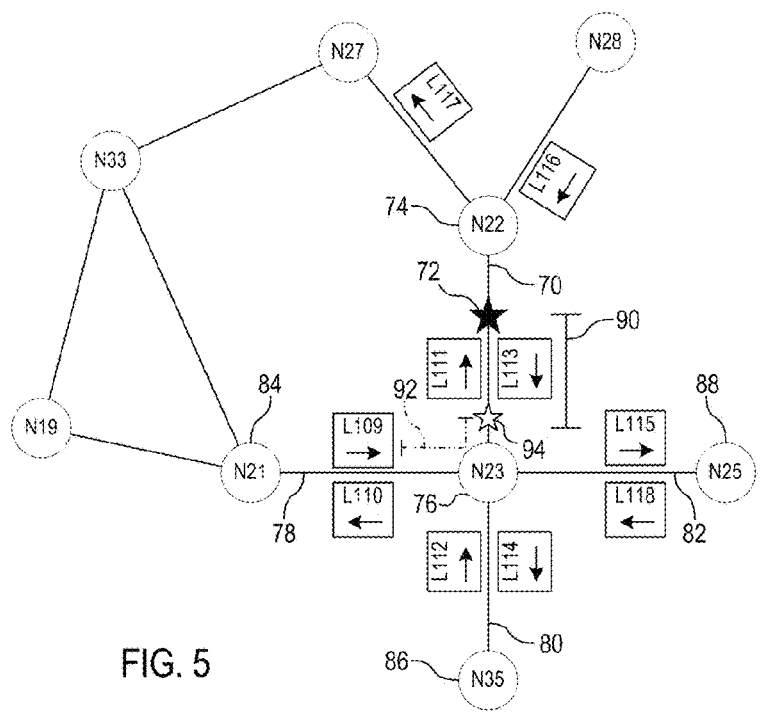
FIG. 5 is a schematic diagram showing links from which information may be measured and stored in a link database according to an embodiment of the invention.

FIG. 5 shows a schematic diagram or network of links from which information may be measured and stored in a link database according to an embodiment of the invention. A first link 70, identified by a link identifier of L113, represents a current link that a vehicle 72 is currently travelling on. First link 70 has a start node 74, identified by a node identifier of N22, and an end node 76, identified by a node identifier of N23. A plurality of links 78, 80, 82, identified by link identifiers L110, L114, and L115, respectfully, has node N23 as a starting node. Links 78-82 have respective end nodes 84, 86, 88, identified by node identifiers N21, N35, and N25, respectively. Links 70, 78-82 are directional such that travel, for example, from node 76 to node 84 corresponds to one link, L110, while travel in the opposite direction from node 84 to node 76 corresponds to another link, L109.

Figure 6:
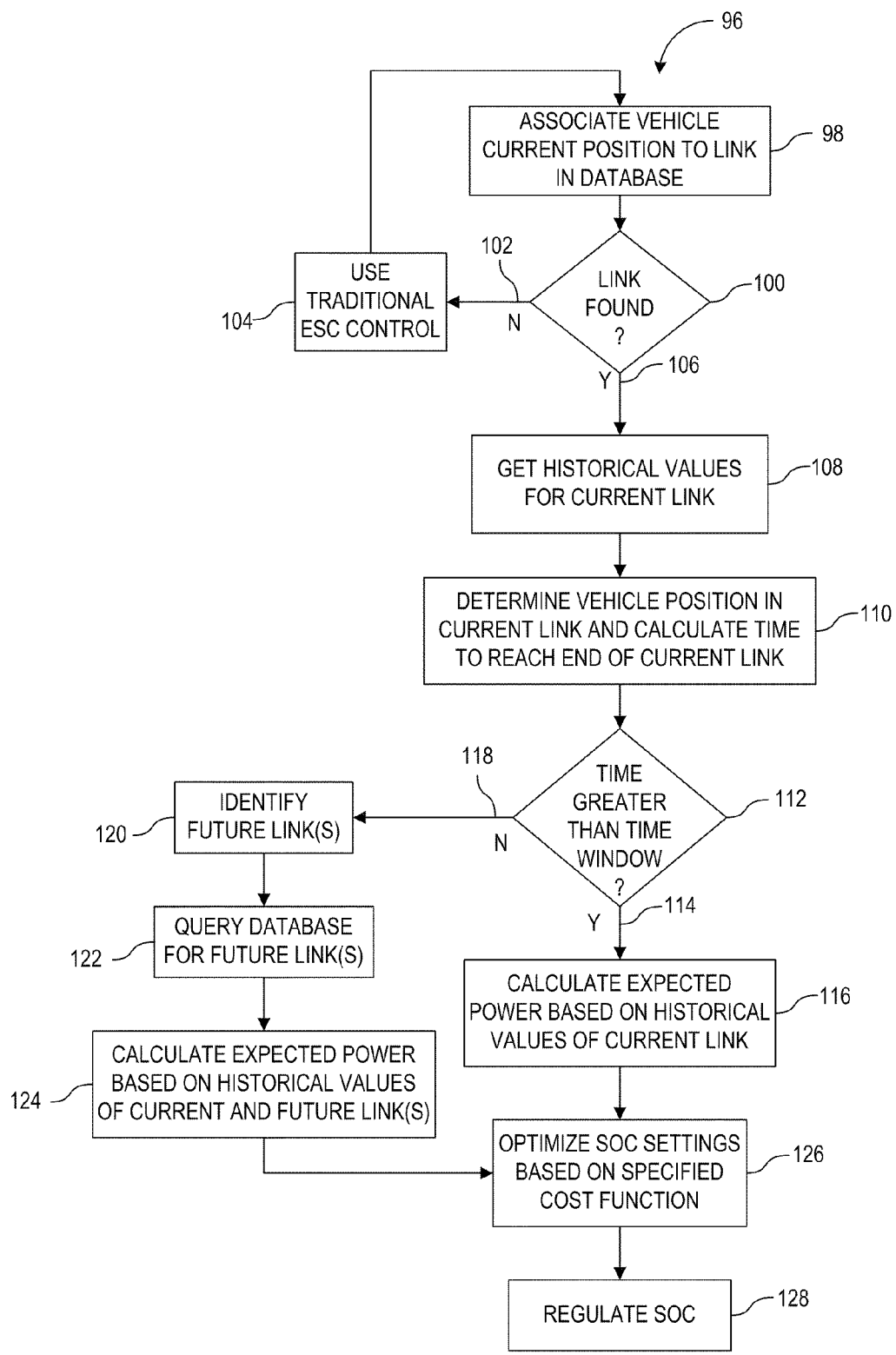
FIG. 6 is a flowchart showing a technique for calculating expected power usage and optimizing state of charge values for an energy storage component according to an embodiment of the invention.

FIG. 6 shows a technique 96 for calculating expected power usage and optimizing state of charge values for an energy storage component according to an embodiment of the invention. Technique 96 may be programmed into a computer or controller such as computer 26 of FIG. 1. Technique 96 begins at block 98 by associating a vehicle current position to a link in a database. The link may be found by measuring the latitude and longitude or position of the vehicle and a direction of vehicle travel via a Global Positioning System (GPS) sensor, for example. The vehicle position data may be compared with end node position data for the links in the database and with positions interpolated between the end nodes. At block 100, technique 96 determines whether a link from the database has been found having data corresponding to the vehicle position and direction of vehicle travel.

If no link in the database is found 102, a traditional or conventional ESC control is used at block 104 because no historical data exists in the database. According to one embodiment, the traditional ESC control controls a state of charge of the energy storage component(s) of the hybrid vehicle toward a midpoint value in the range of state of charge values. For example, the default state of charge of the energy storage component of the hybrid vehicle may be set to a value midway between a maximum charge and a minimum charge of the energy storage component. If a link is found 106, the link is set as the current link, and historical values for the current link are acquired from the database at block 108. According to an embodiment of the invention, terrain data, gradients, elevation, or topography for the current link are not acquired.

At block 110, the position of the vehicle within the current link is determined, and the time the vehicle will likely take to reach the end of the current link is calculated. In one embodiment, technique 96 calculates expected power usage and optimizes, over a window of time or time interval, the state of charge values for energy storage components of a hybrid vehicle. For example, optimization of the state of charge settings may include optimizing the settings for a five-minute interval. Other intervals of time are also contemplated herein. FIG. 5 illustrates an example of a time window 90 extending from the current position of vehicle 72 and in the direction of travel.

At block 112, technique 96 determines whether the time calculated for the vehicle to reach the end of the current link is greater than the time window. If the time calculated for the vehicle to travel in the current link is greater than the time window 114, an expected power usage by the hybrid vehicle is calculated at block 116 based on the historical values acquired at block 108, based on the time window, and based on the vehicle position. For example, FIG. 5 shows that time window 90, which begins at the position of vehicle 72, is less than the time expected for vehicle 72 to reach the end of link L113.

If the vehicle is expected to reach the end of the current link and to continue travel via another future link before the end of the time window 118, technique 96 includes data based on the future link when calculating expected power usage. Accordingly, technique 96 includes identification of one or more future links 120 that the vehicle may travel along after reaching the end node of the current link. In one embodiment, all links that have a start node in common with the end node of the current link may be selected for identification. Future link identification may ignore a link that travels in the opposite direction to the current link if desired.

After identification of future links at block 120, the database of historical stored values is queried at block 122 to retrieve data related to the future link(s). For example, the historical power usage data, frequency of link travel, and other statistics of each identified future link may be retrieved. Additionally, relevant link data such as data related to the current time of the day or vehicle type may be retrieved while link data related to a different time of the day may be ignored. According to an embodiment of the invention, the retrieved data is absent terrain data.

Expected power usage is calculated at block 124 based on the time window and vehicle position and based on the acquired historical values of the portions of the current and future links corresponding to the expected vehicle travel. In one embodiment, the portion of expected power usage that is based on future link travel may be determined solely from the future link having the highest frequency of travel after the end node of the current link is reached. For example, referring to FIG. 5 and rows 10-12 in Table 2 above, a time window 92 (shown in phantom) based on a position 94 of vehicle 72 extends beyond end node N23 of link L113. As shown in Table 2, link L110 has a higher frequency of travel than links L114 and L115 when vehicle 72 travels beyond node N23 after travelling on link L113. In this embodiment, the respective portions of the current link, L113, and the most likely future link, L110, are used to calculate the expected power usage.

In another embodiment, the portion of expected power usage that is based on future link travel may be determined from a weighted average of some or all probable future links based on their frequency of travel after the end node of the current link is reached. For example, referring to FIG. 5 and rows 10-12 in Table 2 above and based on position 94 of vehicle 72, portions of links L110, L114, and L115 each contribute to that portion of expected power usage calculation based on future link travel. In this embodiment, the relevant data from links L110, L114, and L115 are averaged according to weights 0.80, 0.15, and 0.05, respectively, based on their frequency.

Based on the historical power usage demands previously measured along the link or links that the vehicle is expected to travel, the expected power usage calculated at either block 116 or block 124 determines biasing state of charge setpoints of the battery or energy storage component of the hybrid vehicle above or below a midpoint state of charge to optimize battery power usage. The biasing state of charge setpoints are optimized based on specified cost functions at block 126. The cost functions are used to provide vehicle operation optimization of the energy storage components used with the engine or fuel cell. By assigning costs to different aspects of battery use and energy management, a reduced life cycle cost for the vehicle system can be provided. Examples of cost functions are amp-hour throughput; depth of discharge, charge, and discharge rates; fuel converter operating points (efficiency); emission outputs; and the like. In this manner, optimization of the battery may consider trade-offs between life cycle and efficiency costs.

The optimization of state of charge settings may set biasing state of charge setpoints along an expected route of vehicle travel such that the battery may be near a fully-charged state of charge just prior to large or sustained power requirements to supply boosting power during increased power usage periods. The optimization of state of charge settings may also set biasing state of charge setpoints along the expected route such that the battery may be near a fully-discharged state of charge just prior to large or sustained power generation opportunity to such that regenerative braking of a traction motor may supply charging power to recharge the battery to the next biasing state of charge setpoint. Furthermore, the optimization of state of charge settings may optimize the charging or discharging of the battery to extend its life. For example, a rate of charging may be reduced based on knowledge of the historical data that an extended opportunity for charging will occur. In this manner, the battery may be slowly recharged over, for example, a 10 mile stretch of road to a 100% state of charge instead of being quickly recharged over the first 2 miles of the 10 mile stretch while leaving no recharging during the last 8 miles. In this manner, lower stresses to the battery, lower resistive losses, crystal growth control, and lower battery temperature all contribute to an increase in battery life while increasing efficiency considering charging losses.

Accordingly, optimization of state of charge settings includes optimization of engine or fuel cell and energy storage component usage along the expected route of vehicle travel. For example, the optimized state of charge settings may cause the computer 26 of FIG. 1 to reduce a current state of charge of the ESCs 24 to a lower level such that efficient use of the fuel conversion unit 20 may be achieved during a period of acceleration based on the cost functions. The optimized state of charge settings may also cause the computer 26 of FIG. 1 to increase a current state of charge of the ESCs 24 to a higher level set by the expected power such that efficient use of regenerative braking may be achieved during a period of negative power use based on the cost functions. Additionally, the optimized state of charge settings may cause the computer 24 to operate traction motor 16 in a generating mode to increase a current state of charge of the ESCs 24 to a higher level even when a regenerative braking opportunity is not imminent such that a sustained power boost may be supplied thereafter by the traction motor 16 in a motoring or traction mode during an upcoming increased power demand period.

After the state of charge settings are optimized 126, the ESC state of charge may be regulated according to the optimized state of charge settings at block 128 during travel of the hybrid vehicle along the expected route. Referring also to FIG. 1, if a target biasing state of charge setpoint set by the optimized state of charge settings according to the present location of hybrid vehicle 10 within the current link is lower than the current ESC state of charge measured or determined by state of charge sensor 36, the optimized state of charge settings cause the computer 26 to reduce a current state of charge of ESCs 24 to the lower biasing state of charge setpoint set by the optimized state of charge settings. Decreasing the ESC state of charge may be achieved by operating the traction motor 16 via ESCs 24 in a motoring or traction mode. If the biasing state of charge setpoint set by the optimized state of charge settings according to the present location of hybrid vehicle 10 within the current link is higher than the current ESC state of charge, the optimized state of charge settings cause the computer 26 to charge battery 24 to the higher biasing state of charge setpoint set by the optimized state of charge settings. Increasing the ESC state of charge may be achieved during a regenerative braking mode when no power from fuel conversion unit 20 is being supplied to EMS 12 or during transfer of some power from fuel conversion unit 20 to EMS 12.

The present location of hybrid vehicle 10 within the current link along the expected route may be determined from a location sensor 38 or via a time interval, for example. If the current link that the vehicle is travelling along is determined to be a different one than is set for the current optimized state of charge settings, a new set of optimized state of charge settings may be generated as described above.

Embodiments of the invention allow energy storage components of hybrid power systems to be prepared for upcoming events. Accordingly, rather than including a large energy storage component set to maintain a state of charge at 50% to provide power for unknown future events, a smaller energy storage component may be used by taking advantage of known future power demands for state of charge control. Accordingly, controlling energy storage component according to embodiments of the invention allows for a cost reduction achieved through a smaller device and through increasing its life cycle due to lower life-impacting stresses thereof such as high current charging and discharging.

Figure 7:
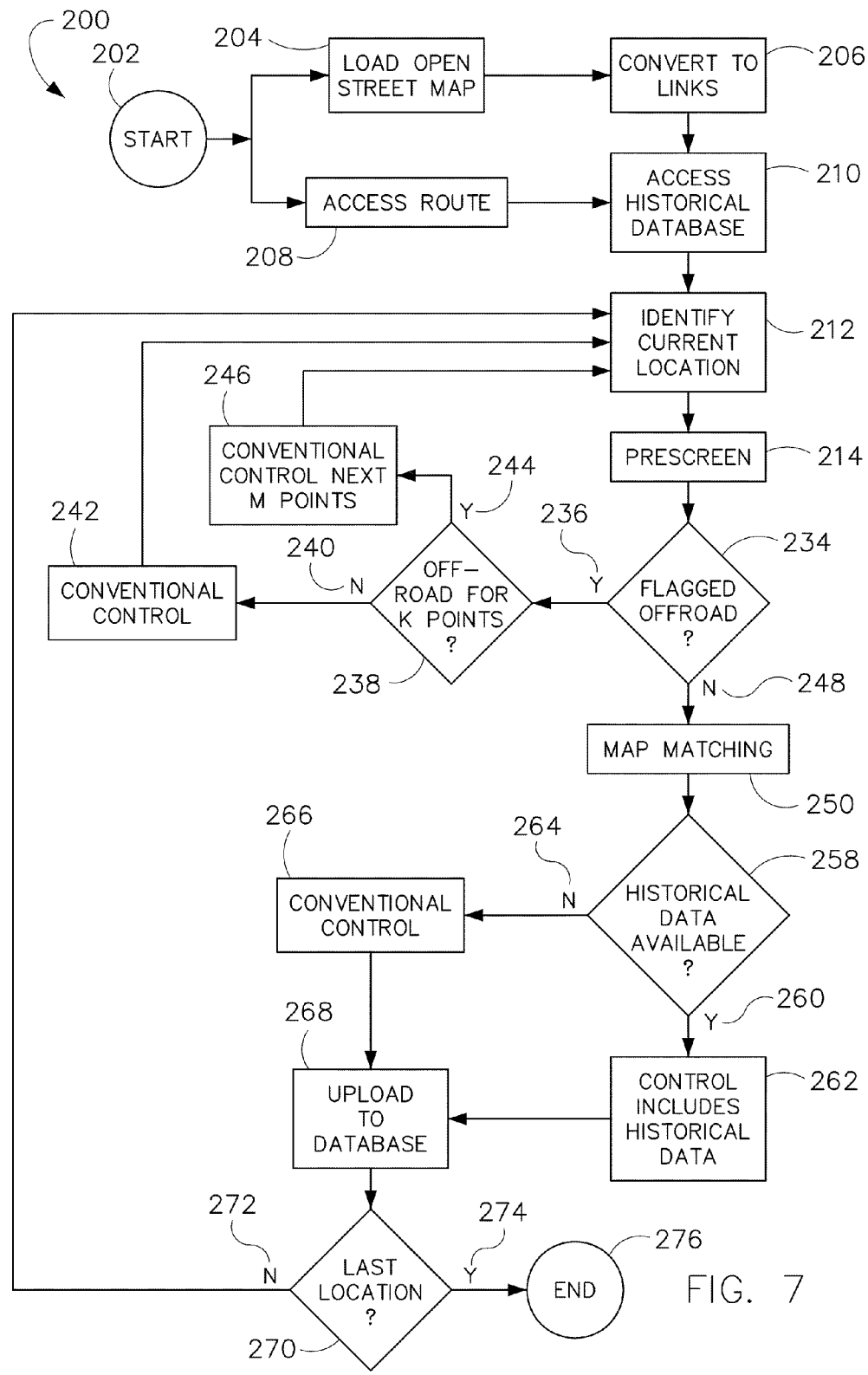
FIG. 7 is a flowchart showing a technique for screening a map and uploading data to a database according to an embodiment of the invention.

Referring now to FIG. 7, an overall scheme 200 for database access, vehicle control, and database upload is illustrated according to an embodiment of the invention. Scheme 200 is preferably implemented in a controller or computer system of an electric or hybrid vehicle for traveling from one location to another. Scheme 200 starts at block 202, and a map database is loaded at block 204 and converted to map links at block 206. Typically, the map links may be defined by known features in a map such as road intersections, by known addresses, or by map coordinates, as examples. In one embodiment the route is loaded at block 208, and in another embodiment the route is accessed in realtime at block 208 and while traveling. A historical database is accessed at block 210 and in one embodiment the historical links of the database are correlated to map links that were converted in step 206. Accordingly, map intersections, for instance, may be defined as nodes within the map database, which may correspond to node locations within the historical database. One skilled in the art will recognize that nodes defined in the historical database can be correlated to known features within the map. The current location of the vehicle along the route is identified at block 212 via, for instance, a GPS unit, and the current location is pre-screened against links of the map at block 214 as will be discussed with in FIGS. 8 and 9.

Figure 8:
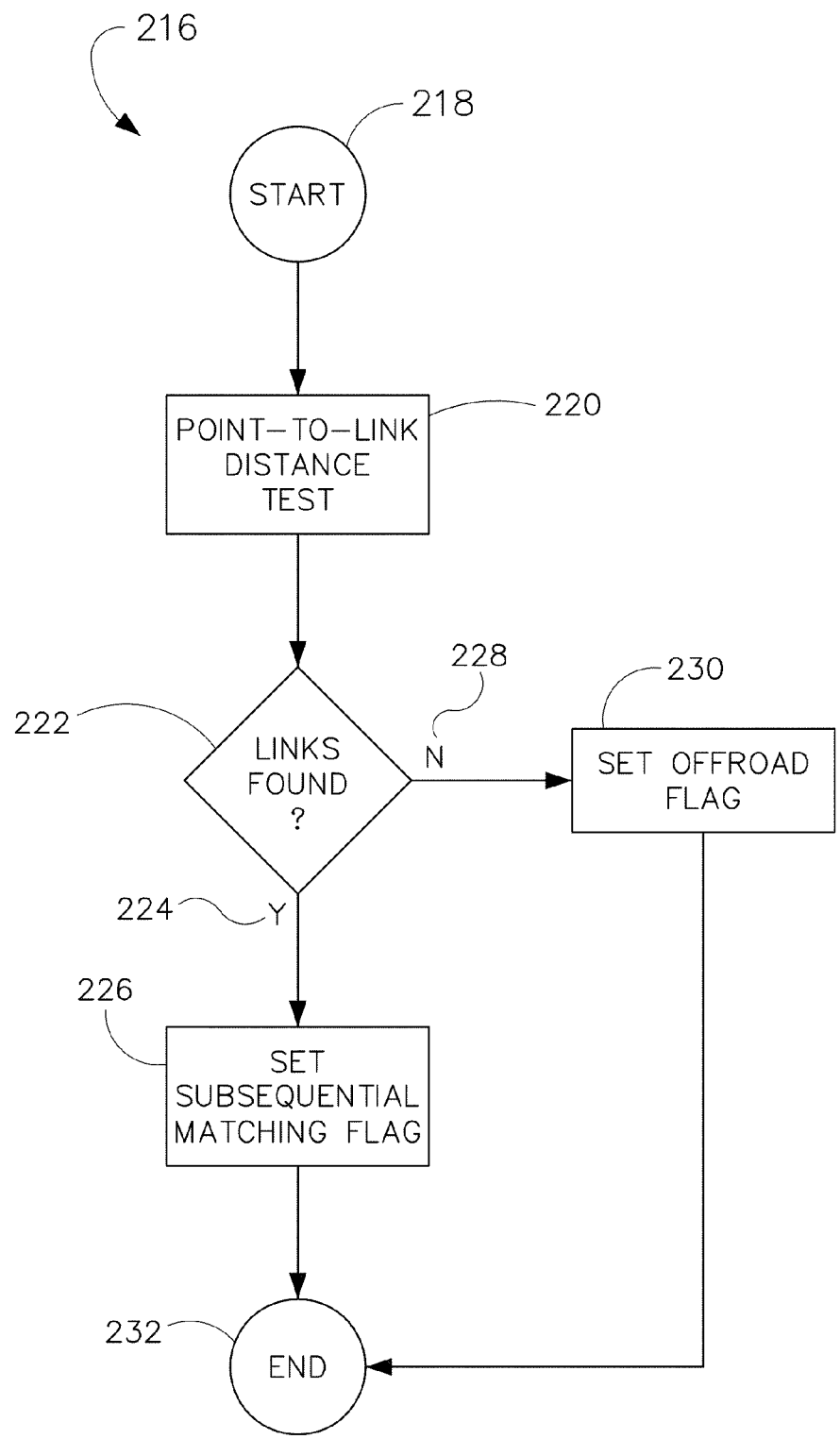
FIG. 8 is a flowchart showing a technique for pre-screening possible links in a map database according to an embodiment of the invention.

Referring to FIG. 8, pre-screening block 214 of FIG. 7 is illustrated as pre-screening process or technique 216, according to an embodiment of the invention. Technique 216 starts at block 218, and an initial matching or location-to-link distance test 220 is conducted to find one or more possible links for correlating map links with the current position of the vehicle. Test 220 includes an assumption that a current location of the hybrid vehicle is known, having been obtained for instance by a GPS system as described with respect to block 212 of FIG. 7.

Typically, a map database includes links that are uniquely defined by start and end nodes (i.e., intersections, addresses, map coordinates, and the like) as described above. According to this embodiment of the invention, the location-to-link distance test 220 includes a distance calculation from a current location of the vehicle to links within the map database. In one embodiment, the distance calculation calculates the distance of the current location to the closest portion of each of the links in the map database. Based on the distance calculations, test 220 includes an algorithm that can screen out links within a map database that are far away from the current vehicle location in order to quickly find one or more possible links for determining or estimating a true location of the vehicle location on the map.

Figure 9:
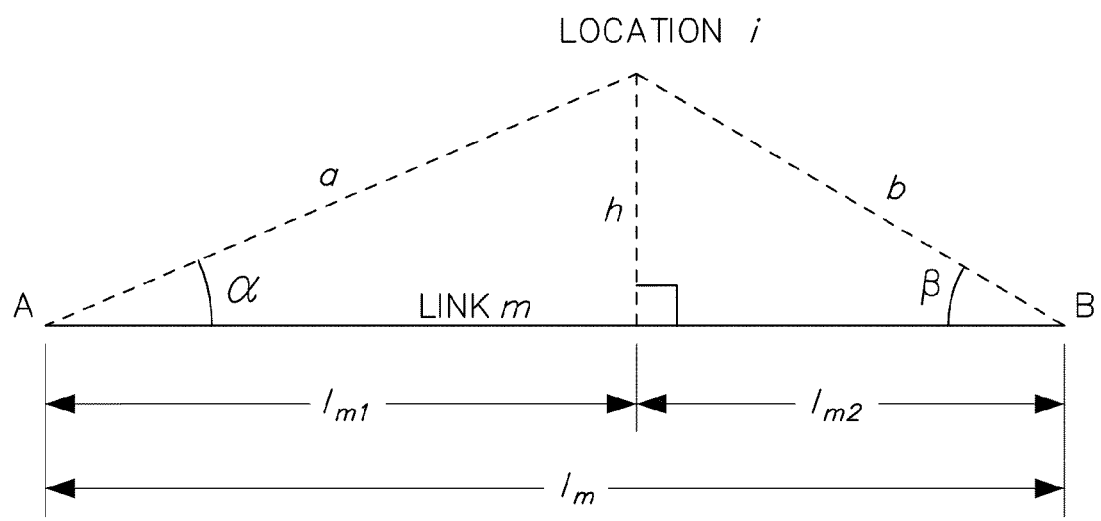
FIG. 9 is illustrates aspects of a location-to-link test according to an embodiment of the invention.

Referring to FIG. 9, elements of the location-to-link test 220 of FIG. 8 are illustrated according to an embodiment of the invention. Test 220 includes determining a distance between a location "i" and endpoints A and B of a link "m", and using the distances determined to quickly screen all links within a map database. Because the map database has been correlated to the historical database, once the map link has been identified, then historical data corresponding therewith is available for determining control parameters for the vehicle, according to embodiments of the invention. Further, one skilled in the art will recognize that the location-to-link test may be based on an assumption that the link distance (i.e., $l_m$) is linear, though it is recognized that the links in the map database are not always linear and may have a curvature associated therewith.

The variable h denotes the distance from location i to link m, and the variable $\epsilon$ is a parameter that may be selected based on what level of screening is desired to find candidate links within a map. In one embodiment $\epsilon$ is selected to correspond to a parameter related to GPS accuracy, such as 5 meters. In another example, $\epsilon$ is set much larger, for instance 100 meters, to screen a larger number of possible map links while still removing a large percentage, such as 99% or more, of the total links in the map database. To illustrate, for any $\epsilon>0$, $h \geq \epsilon$, if the distance from location i to either of the nodes A, B of link m is greater than $l_{max}+2\epsilon$, where max $l_{max}$ is the maximal link length among all links of the map database, and neither of the angle $\alpha$ and $\beta$ in FIG. 9 is greater than 90°. According to the triangle illustrated, the following inequalities may be generated $h \geq a - l_{m1}$; $h \geq b - l_{m2}$. Hence, $$h \geq \frac{a+b-l_m}{2} \geq \frac{a+b-l_{max}}{2} \geq \frac{\max(a,b)-l_{max}}{2}.$$

As such, $h \geq \epsilon$ if $$\frac{\max(a,b)-l_{max}}{2} \geq \varepsilon.$$

Thus:

$$\max(a,b) \geq l_{max}+2\epsilon; \qquad \text{Eqn. 1.}$$

As such, based on a current location, distances a, b to respective nodes A, B can be calculated and their maximum can be compared to a simple sum $l_{max}+2\epsilon$. As stated, $l_{max}$ is the maximum link length in the map database, and $\epsilon$ corresponds to a pre-set value (5 meters in one example and 100 meters in another example). Thus, simple length-node calculations can be computed and a simple comparison can be conducted according to Eqn. 1 in order to quickly screen the map database for links that are close to the current location of the hybrid vehicle and within a distance $\epsilon$ from the current location. Links that do not meet the criteria are discarded, and remaining links that meet the criteria are possible links to which the distance is calculated from the current measured location.

Referring back to FIG. 8, an inquiry is made at block 222 as described with respect to Eqn. 1. If block 222 passes 224, (i.e., one or more links of the map database meet the criteria of Eqn. 1), then a flag is indicated at block 226 in, for instance, a computer algorithm to determine the closest of the candidate links and perform a subsequential matching step, which will be described later. If block 222 does not pass 228 the criteria, then an off-road flag is indicated at block 230, and no links are deemed present within the bounds defined in Eqn. 1. Pre-screening technique 216 ends at block 232.

Referring back to FIG. 7, as described above, pre-screening block 214 of technique 200 sets a flag that signifies whether the vehicle is off-road or whether a subsequential matching block will be performed. Referring to decision block 234, if flagged off-road 236, then a conventional control scheme is implemented. According to one embodiment, at block 238 a determination is made whether several sequential locations (i.e., "K" locations—an integer greater than one, and 10 as one example) have been flagged to be off-road. If not 240, then a conventional vehicle control scheme is implemented at block 242, and process control is returned to block 212. However, if K sequential locations have been flagged to be off-road 244, then for the next M locations measured, conventional control is implemented 246 without pre-screening the M locations while assuming that the M locations are off-road locations, thus reducing computational burden, according to an embodiment of the invention. It is to be understood that in some instances the vehicle will actually be traveling off-road, while in other instances the vehicle may be traveling on a road that has not been entered into the map link database, such as in the case of a new road that has been built after the database was generated.

In embodiments of the invention M is an integer value that is greater than one, and may be 10 as an example. In another embodiment, M is set equal to K, and K may be set to any integer greater than one. Thus, scheme 200 includes a loop that determines whether the vehicle is off-road and includes a method or means to skip additional calculations if several sequential locations are off-road. No historical data is stored when the vehicle is off-road because there is no link associated therewith in the map. While one or more positions of the vehicle may not correspond to an off-road location if each of the M locations was to be pre-screened, any loss of such historical data is considered to be minimal against an overall reduction in computational demand afforded by technique 200.

Still referring to FIG. 7, if at block 234 the hybrid vehicle is not determined to be off-road 248 (i.e., flagged for subsequential matching, which may typically occur for a majority of locations screened), then a map-matching algorithm is implemented at block 250 and, according to one embodiment, block 250 includes the subsequential matching algorithm as discussed above. If one or more map links have been found to meet the criteria of Eqn. 1 and a subsequential matching algorithm has been flagged, then the link corresponding to vehicle location may be based on a trajectory of GPS locations according to an embodiment of the invention.

Figure 10:
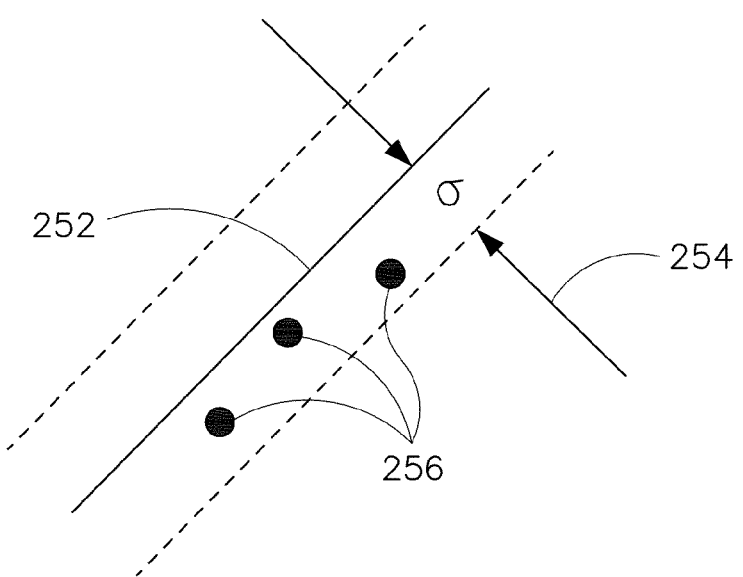
FIG. 10 illustrates points on a GPS trajectory for subsequential matching according to an embodiment of the invention.

Referring to FIG. 10, points on a GPS trajectory are illustrated for subsequential matching GPS points along a trajectory of a map, according to an embodiment of the invention. According to this embodiment, a trajectory 252 includes a boundary or value 254 $\sigma$ that serves as a bounds for subsequentially matching GPS locations 256. GPS locations 256 may be correlated to trajectory 252 based on a current GPS location and whether the current location is generally parallel or generally tracks to a map link. In one embodiment $\sigma$ is 20 meters, but one skilled in the art will recognize boundary of value 254 may be a different value, depending on a particular application. Thus, instead of calculating more computationally burdensome distances to a point in the nearest map link or links identified from Eqn. 1, a simple determination may be implemented to determine whether measured locations 256 generally follow a trajectory of a previously determined map link and, if so, the algorithm determines the vehicle has not deviated from link and the current location is determined to again correlate or match to the last link. In embodiments of the invention, trajectory 252 may be in a linear direction as illustrated, however it is to be recognized that trajectory 252 may include curves as well, and the measured GPS locations 256 may be correlated thereto. Once the link is identified and based on the vehicle's current location, the historical database may be accessed at a location that corresponds to the current GPS location and along the link identified.

Thus, referring back to FIG. 7, at block 258 and after determination of the current historical database location as discussed, scheme 200 determines if historical data is available for the current location and link. If so 260, then control of the vehicle includes use of the available historical data at block 262 as discussed above. If not 264 (i.e., no prior data for the given location has been uploaded to the historical database for this location), then control of the vehicle is conventional at block 266. Regardless of whether control of the vehicle includes historical data, because travel is over a known map link, power and other statistical data related to operation of the hybrid vehicle such as acceleration, deceleration, stop-start information, and the like is then available for upload to the historical database at block 268, and the historical database may be both A) used for determining a control scheme based on previously measured data, and B) updated with information related to the current pass along the link. After upload at block 268, block 270 determines whether the last location (i.e., the end of the trip) has been reached. If not 272, then process control returns to block 212 where a current location is identified, and the process repeats by pre-screening at block 214. If the last location 274, the scheme 200 ends at block 276.

Thus, scheme 200 operates at a high degree of computational efficiency by quickly identifying and pre-screening the current location and map matching via a subsequential matching algorithm. Available historical data may be used to improve overall system efficiency at a given link, and information learned during traversal of the link may be uploaded to the database to further refine power use and other important control information during future traversals thereon. If off-road operation is identified for a series of locations, then scheme 200 may avoid possible delay by assuming a subsequent series of locations is also off-road.

A technical contribution for the disclosed system and method is that it provides for a computer-implemented system and method for creating a database for energy management and operation of hybrid and electric vehicles.

Therefore, according to an embodiment of the invention, a system for operating an electric or hybrid-electric vehicle includes a computer programmed to identify a location of a vehicle, access a map and identify a plurality of links therein, pre-screen the plurality of links to identify if any of the plurality of links is within a given bounds of the current location, and if one or more possible links are identified, then match the current location of the vehicle to one of the identified links, and upload power data for the vehicle corresponding to the matched location into a database.

According to another embodiment of the invention, a method of controlling operation of an electric or hybrid-electric vehicle includes identifying a current location of a vehicle, applying a pre-screening algorithm with respect to a link within a map and the current location, determining if the one or more links are within a given bounds, and, if so, then matching the current location of the vehicle to the link within the map via a subsequential matching algorithm, and uploading power information used by the vehicle along the link and at the current location into a historical power-use database.

According to another embodiment of the invention, a computer readable storage medium having a computer program stored thereon and representing a set of instructions that when executed by a computer causes the computer to measure a current location of a vehicle, execute a pre-screening algorithm to determine possible links of a map that are within a predetermined distance from the current location and, if one or more links are within the predetermined distance from the current location, then the computer is caused to execute a map-matching algorithm to determine which of the one or more links corresponds to the actual link along which the vehicle is traveling, and upload power information related to the vehicle at the current location to a historical database.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electric or hybrid-electric vehicle comprising a computer programmed to:
   identify a current location of a vehicle;
   access a map within a database and identify a plurality of links therein;
   pre-screen the plurality of links to identify if any of the plurality of links is within a given bounds of the current location; and
   if one or more possible links are identified, then:
      calculate a distance from the current location to one identified link of the one or more possible links;
      if the calculated distance, and a plurality of previously identified current locations, are within a given distance to the one identified link, then forgo calculating the distance to the one identified link when determining a subsequent current location; and
      upload power data for the vehicle corresponding to the subsequently determined current location into the database, the uploaded power data corresponding to the one identified link.

2. The system of claim 1 wherein the computer, in being programmed to pre-screen the plurality of links, is programmed to identify which links are within the given bounds of the current location using a maximum link length within the database.

3. The system of claim 2 wherein the computer, in being programmed to match the current location of the vehicle to one of the identified links, is programmed to match the current location of the vehicle to the one of the identified links via a subsequential matching algorithm.

4. The system of claim 2 wherein the computer is programmed to determine that the current location of the vehicle is off-road if no possible link is identified.

5. The system of claim 4 wherein the computer is programmed to:
   determine a number K of consecutive identified current locations that have been determined to be off-road; and
   set a next number M of subsequent identified current locations to be off-road if K is greater than a threshold value, wherein K and M are each integers greater than 1.

6. The system of claim 1 wherein the computer, if one or more possible links are identified, is programmed to:
   acquire historical power data from the database that corresponds to the link matched to the current location; and
   control operation of the vehicle based on the acquired historical data.

7. The system of claim 1 wherein the computer is programmed to identify the current location of the vehicle via a global positioning system (GPS) sensor.

8. The system of claim 1 wherein the computer is programmed to identify the one identified link as a link within the plurality of links that is nearest the identified current location of the vehicle.

9. A method of energy management of an electric or hybrid-electric vehicle comprising:
   identifying a current location of a vehicle;
   applying a pre-screening algorithm with respect to a link within a map and the current location, the pre-screening algorithm based on a maximum link length of a historical power-use database;
   determining if one or more links are within a given bounds, and, if so, then:
      matching the current location of the vehicle to the link within the map via a subsequential matching algorithm; and
      uploading power information used by the vehicle along the link and at the current location into the historical power-use database.

10. The method of claim 9 comprising determining that the vehicle is off-road if one or more links are determined not to be within the given bounds.

11. The method of claim 10 comprising assuming M subsequent current locations to be off-road if K consecutive current locations are determined to be off-road, wherein K and M are each integers greater than 1.

12. The method of claim 9 comprising controlling operating parameters of the vehicle based on historical information stored in the power-use database regarding the link.

13. The method of claim 9 wherein identifying the current location of the vehicle comprises identifying the current location via a global positioning system (GPS).

14. A computer readable storage medium having a computer program stored thereon and representing a set of instructions that when executed by a computer causes the computer to:
   measure a current location of a vehicle;
   execute a pre-screening algorithm to determine possible links of a map that are within a predetermined distance from the current location; and:
   if one or more links are within the predetermined distance from the current location, then the computer is caused to:
      execute a map-matching algorithm to determine which of the one or more links corresponds to the actual link along which the vehicle is traveling; and
      upload power information related to the vehicle at the current location to a historical database;
   if no link is within the predetermined distance from the current location, the instructions cause the computer to determine that the current location of the vehicle is off-road, and if K consecutive current locations are determined to be off-road, then the instructions cause the computer to assume that a next M subsequent current locations are off-road, wherein K and M are each integers greater than 1.

15. The computer readable storage medium of claim 14 wherein the instructions that cause the computer to execute the pre-screening algorithm cause the computer to determine the possible links via a location-to-link test.

16. The computer readable storage medium of claim 14 wherein, if one or more links are within the predetermined distance from the current location, the instructions that cause the computer to execute the map-matching algorithm cause the computer to match the current location of the vehicle to the actual link within the map via a subsequential matching algorithm.

17. The computer readable storage medium of claim 14 wherein the instructions cause the computer to control operation of the vehicle using operating parameters based on historical information stored in the historical database.

18. The computer readable storage medium of claim 17 wherein the instructions cause the computer to determine the operating parameters based on historical power-use data regarding the current link.

19. The computer readable storage medium of claim 14 wherein the instructions cause the computer to measure the current location of the vehicle via a global positioning system (GPS).

20. The computer readable storage medium of claim 14 wherein the pre-screening algorithm is calculated based on a maximum link length of the historical database.

* * * * *